(No Model.)
T. A. CROSS.
POST HOLE DIGGER.
No. 471,767. Patented Mar. 29, 1892.
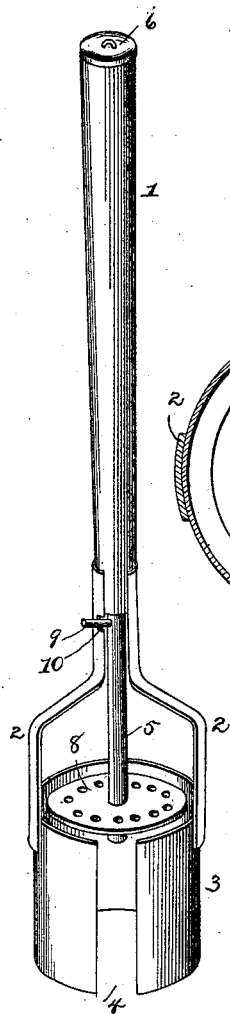
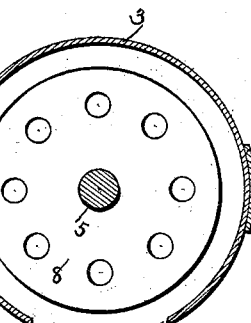
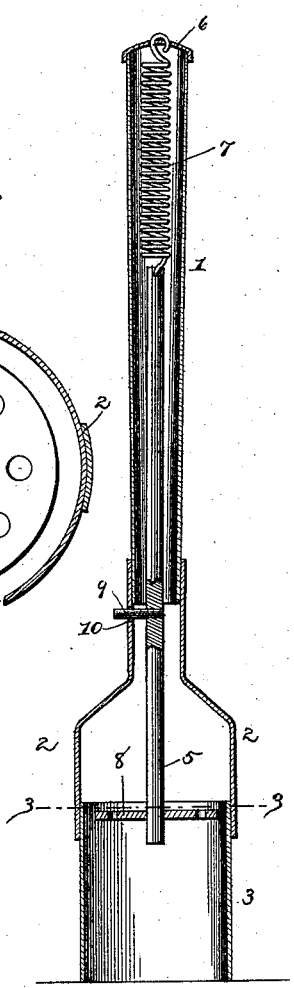
Witnesses:
B. S. Ober
W. S. Duvall
Inventor
Thomas A. Cross
By his Attorneys,
C. A. Snow & Co.

UNITED STATES PATENT OFFICE.

THOMAS A. CROSS, OF BARDWELL, KENTUCKY, ASSIGNOR OF TWO-THIRDS TO ROBERT H. WEBB AND FRANK W. TURK, OF SAME PLACE.

POST-HOLE DIGGER.

SPECIFICATION forming part of Letters Patent No. 471,767, dated March 29, 1892.

Application filed June 4, 1891. Serial No. 395,045. (No model.)

*To all whom it may concern:*

Be it known that I, THOMAS A. CROSS, a citizen of the United States, residing at Bardwell, in the county of Carlisle and State of Kentucky, have invented a new and useful Post-Hole Digger, of which the following is a specification.

This invention relates to post-hole diggers; and it has for its object to provide a device of this class which shall be simple in construction and efficient in operation, and which shall be provided with means for expelling the dirt.

The invention consists in the improved construction and arrangement of parts, which will be hereinafter fully described, and particularly pointed out in the claim.

In the drawings hereto annexed, Figure 1 is a perspective view of a post-hole digger constructed in accordance with my invention. Fig. 2 is a vertical sectional view of the same. Fig. 3 is a transverse section taken on the line 3 3 in Fig. 2.

Like numerals of reference indicate like parts in all the figures.

The handle 1, which is tubular, as will be seen in Fig. 2 of the drawings, is provided at its lower end with diverging arms 2 2, to the lower ends of which is attached the blade or cutter 3, which is cylindrical in shape and provided with a vertical slot 4.

5 designates a rod or stem arranged in the tubular handle, and connected with the cap 6 of the latter by means of a coiled spring 7. The lower end of the rod or stem 5 carries a circular plate 8, which may be made of cast-iron perforated, as will be seen in Fig. 3 of the drawings. The stem or rod 5 is provided with a laterally-extending arm or treadle 9, adapted to engage a notch 10 in one of the arms or brackets 2.

In operation the blade of the implement is forced into the ground, thus enabling the dirt, which is held by the flexible or elastic blade, to be readily removed. To remove the dirt from the blade, the treadle 9 is disengaged from the notch 10 and the rod or stem carrying the cleaning-plate 8 may then be pushed in a downward direction, thus pushing the dirt out from the blade or cutter. The tension of the spring 7 will restore the rod carrying the cleaning-plate to its elevated position, when the treadle is released from pressure. When the treadle engages the notch 10 it may be used as a rest for the foot of the operator to assist him in forcing the implement into the ground.

Having thus described my invention, what I claim is—

In a post-hole digger, the combination of the tubular handle, the diverging arms carrying the cylindrical blade or cutter, one of said arms being provided with a notch, the vertically sliding and rotatable stem or rod carrying the cleaning-plate and having a laterally-extending arm adapted by the rotation of the rod to be swung into the notch, and a spring arranged to force the said plate in an upward direction, substantially as and for the purpose set forth.

In testimony that I claim the foregoing as my own I have hereto affixed my signature in presence of two witnesses.

THOMAS A. CROSS.

Witnesses:
 J. B. RAY,
 H. M. SAUNDERS.